US011027836B2

(12) United States Patent
Lacy et al.

(10) Patent No.: US 11,027,836 B2
(45) Date of Patent: Jun. 8, 2021

(54) ROTORCRAFT WITH CANTED COAXIAL ROTORS

(71) Applicant: The Boeing Company, Chicago, IL (US)

(72) Inventors: Roger W. Lacy, West Chester, PA (US); Michael J. Duffy, Lansing, NY (US); David H. Mason, Glenmoore, PA (US)

(73) Assignee: The Boeing Company, Chicago, IL (US)

(*) Notice: Subject to any disclaimer, the term of this patent is extended or adjusted under 35 U.S.C. 154(b) by 302 days.

(21) Appl. No.: 16/035,245

(22) Filed: Jul. 13, 2018

(65) Prior Publication Data
US 2020/0017204 A1 Jan. 16, 2020

(51) Int. Cl.
B64C 27/52 (2006.01)
B64C 27/10 (2006.01)
G05D 1/08 (2006.01)
B64C 39/02 (2006.01)
B64C 27/82 (2006.01)

(52) U.S. Cl.
CPC .............. B64C 27/52 (2013.01); B64C 27/10 (2013.01); G05D 1/0808 (2013.01); B64C 39/024 (2013.01); B64C 2027/8227 (2013.01); B64C 2201/024 (2013.01); B64C 2201/108 (2013.01)

(58) Field of Classification Search
CPC ....... B64C 27/52; B64C 27/024; B64C 11/48; B64C 27/10; B64C 2201/108
See application file for complete search history.

(56) References Cited

U.S. PATENT DOCUMENTS

| 2,452,726 | A | * | 11/1948 | Buchet | B64C 27/52 244/17.23 |
| 3,089,666 | A | * | 5/1963 | Quenzler | B64C 9/24 244/7 R |
| 6,719,244 | B1 | * | 4/2004 | Gress | B64C 29/0033 244/17.25 |
| 9,550,577 | B1 | * | 1/2017 | Beckman | B64C 27/08 |
| 2016/0236775 | A1 | * | 8/2016 | Eshkenazy | B64C 29/0025 |

(Continued)

FOREIGN PATENT DOCUMENTS

CN 105270616 A 1/2016

OTHER PUBLICATIONS

European Patent Office; Extended European Search Report; European Patent Application No. 19185948.7; dated Dec. 12, 2019.
(Continued)

Primary Examiner — Christopher D Hutchens
(74) Attorney, Agent, or Firm — Parsons Behle & Latimer

(57) ABSTRACT

A rotorcraft has a frame and a plurality of rotors connected to the frame. The frame has a roll axis and a pitch axis. Each of the rotors includes a rotor shaft. The rotor shaft of each of the rotors is canted with respect to at least one of the roll axis and the pitch axis. The rotor shaft of each of the rotors may be canted between 3 and 15 degrees. Each of the rotors may be a co-axial co-rotating rotor. The rotors may be oriented in opposing pairs across the frame. Both rotors in each opposing pair rotate in the same direction. The rotorcraft may include at least two additional rotors, each having a forward cant. Each of the additional rotors may be a co-axial contra-rotating rotor.

27 Claims, 6 Drawing Sheets

(56) References Cited

U.S. PATENT DOCUMENTS

| | | | |
|---|---|---|---|
| 2016/0340028 A1* | 11/2016 | Datta | B64C 15/12 |
| 2016/0347447 A1* | 12/2016 | Judas | B64C 39/024 |
| 2018/0105267 A1* | 4/2018 | Tighe | B64D 29/02 |
| 2018/0244367 A1* | 8/2018 | Kiesewetter | B64C 27/20 |
| 2018/0281949 A1* | 10/2018 | Mitchell | B64C 11/48 |
| 2018/0339769 A1* | 11/2018 | McCullough | B64C 5/02 |
| 2020/0001995 A1* | 1/2020 | Yang | B64C 27/20 |

OTHER PUBLICATIONS

Niemiec et al; Effect of Rotor Cant on Trim and Autonomous Flight Dynamics of a Quadcopter; Center for Mobility with Vertical Lift (MOVE) 2018.

European Patent Office; Extended European Search Report for Application No. 19185948.7 dated Dec. 16, 2020.

* cited by examiner

ROTORCRAFT WITH CANTED COAXIAL ROTORS

FIELD OF THE DISCLOSURE

The embodiments described herein relate to a rotorcraft. More particularly, the disclosure relates to systems and methods of using a rotorcraft with canted rotors for increased yaw control.

BACKGROUND

Description of the Related Art

Rotorcrafts are aircraft that derive lift from rotating airfoils, also referred to as rotor blades. Rotorcrafts with four or more rotors have become increasingly popular with hobbyists and are developing in commercial applications. These multi-rotor rotorcrafts are generally limited in size and payload capacity. They provide rotorcraft vertical and forward speed control by varying each individual rotors' thrust to generate vehicle forces and moments about the vehicle's three principal axes. Varying all the rotors' thrust in a common direction provides lift and vertical speed control. Varying selected rotors' thrust in differential directions on different sides of the rotorcraft provides vehicular angular or attitude control. This attitude control is also used for translational speed control. And varying selected rotor's thrust in differential directions on symmetrically opposed rotors is the typical method for multi-rotor rotorcraft angular control about the rotorcraft's vertical axis, or yaw control. Known rotorcrafts, such as multi-rotor rotorcrafts, may become more difficult to maneuver under heavy loading and may be less desirable when scaled to the design of larger rotorcrafts. Additionally, power requirements of known rotorcrafts may limit their range and payload capacity. For instance, as the moment of inertia of a rotor increases, more power may be needed to quickly effect changes in rotational speed. As a result, power sources, such as batteries, may be depleted more quickly or the rotorcraft may take longer to conduct a maneuver. Other disadvantages of known rotorcrafts may exist.

SUMMARY

The present disclosure is directed to methods and systems that overcome or lessen some of the problems and disadvantages discussed above. Not all embodiments provide the same advantages or the same degree of advantage.

One exemplary embodiment is a rotorcraft having a frame and a plurality of rotors connected to the frame. The frame has a roll axis and a pitch axis. The pitch axis is perpendicular to the roll axis. Each of the plurality of rotors includes a rotor shaft. The rotor shaft of each of the plurality of rotors is canted with respect to at least one of the roll axis and the pitch axis. The plurality of rotors may be at least four rotors including a first rotor, a second rotor, a third rotor, and a fourth rotor.

The rotor shaft of each of the plurality of rotors may be canted between 3 and 15 degrees with respect to at least one of the roll axis and the pitch axis. The rotor shaft of each of the plurality of rotors may be canted between 3 and 15 degrees with respect to the roll axis. The rotor shaft of each of the plurality of rotors may be canted between 3 and 15 degrees with respect to the pitch axis. Each of the at least four rotors may produce a thrust component oriented perpendicular to an imaginary ray extending from a yaw axis.

The first rotor and the third rotor may be operable for counter-clockwise rotation, and the second rotor and the fourth rotor may be operable for clockwise rotation. The cant of the rotor shaft of each of the plurality of rotors may be fixed. Each of the plurality of rotors may have a diameter greater than 1 meter (3.28 feet). The rotorcraft may have a gross weight of 226.8 kilograms (500 pounds) or more. The rotorcraft may generate lift sufficient to support a payload capacity of between 45.4 and 354 kilograms (100-1000 pounds).

The rotorcraft may include at least two additional rotors. The at least two additional rotors each include a rotor shaft canted with respect to the pitch axis. The rotor shaft of each of the at least two additional rotors may have a forward cant between 3 and 15 degrees with respect to the pitch axis. Each of the at least two additional rotors may be a co-axial contra-rotating rotor. Each of the plurality of rotors may be a co-axial co-rotating rotor. The at least four rotors may be exactly four rotors and the at least two additional rotors may be exactly two additional rotors. The four rotors and the two additional rotors may be oriented in a hexagon pattern. The two additional rotors may be aligned along the pitch axis.

One exemplary embodiment is a rotorcraft having a frame and at least four rotors connected to the frame. The frame has a yaw axis. Each of the at least four rotors has an axis of rotation that is non-parallel and non-perpendicular to the yaw axis. The at least four rotors are oriented in opposing pairs across the frame. Both rotors in each opposing pair are operable for rotation in the same direction. Each of the at least four rotors may produce a thrust component oriented perpendicular to an imaginary ray extending from the yaw axis. The rotorcraft may include at least two additional rotors. The at least two additional rotors may each include an axis of rotation having a forward cant with respect to a pitch axis. The axis of rotation of each of the at least two additional rotors may have a forward cant between 3 and 15 degrees. The axis of rotation of each of the at least four rotors may be canted between 3 and 15 degrees with respect to a roll axis. The axis of rotation of each of the at least four rotors may be canted between 3 and 15 degrees with respect to the pitch axis. Each of the at least four rotors may be a co-axial co-rotating rotor. Each of the at least two additional rotors may be a co-axial contra-rotating rotor.

One exemplary embodiment is a rotorcraft having a frame and a plurality of rotors. The frame has a yaw axis. The plurality of rotors are oriented in opposing pairs around the yaw axis. Both rotors in each opposing pair are operable for rotation in the same direction. Each opposing pair is canted to produce a thrust component oriented perpendicular to an imaginary ray extending from the yaw axis. The rotorcraft may include at least two additional rotors. The at least two additional rotors may each be canted to produce a thrust component oriented parallel to a roll axis. Each of the at least two additional rotors may be a co-axial contra-rotating rotor. Each of the plurality of rotors may be a co-axial co-rotating rotor.

One exemplary embodiment is a method of operating a rotorcraft including supplying power to at least four rotors of a rotorcraft. The at least four rotors each have an axis of rotation that is non-parallel and non-perpendicular to a yaw axis of the rotorcraft. The at least four rotors include at least two opposing pairs of rotors. An opposing first pair of rotors of the at least two opposing pairs includes a first rotor and a third rotor on opposite sides of both a roll axis and a pitch axis of the rotorcraft. An opposing second pair of rotors of the at least two opposing pairs includes a second rotor and a fourth rotor on opposite sides of both the roll axis and the pitch axis. The method includes causing the opposing first pair of rotors to rotate in a counter-clockwise direction and the opposing second pair of rotors to rotate in a clockwise direction and initiating a yawing maneuver. The yawing maneuver increases a rotational speed of the opposing first pair of rotors. The increased rotational speed produces a thrust by the opposing first pair of rotors with a component of the thrust oriented non-parallel to the yaw axis. The component of the thrust may be oriented perpendicular to an imaginary ray extending from the yaw axis. Each of the at least four rotors may be a co-axial co-rotating rotor. The method may include supplying power to at least two additional rotors of the rotorcraft, the at least two additional rotors each including an axis of rotation having a forward cant with respect to the pitch axis. Each of the at least two additional rotors may be a co-axial contra-rotating rotor.

While the disclosure is susceptible to various modifications and alternative forms, specific embodiments have been shown by way of example. The features, functions, and advantages that have been discussed can be achieved independently in various embodiments or may be combined in yet other embodiments further details of which can be seen with reference to the drawings and the following description. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
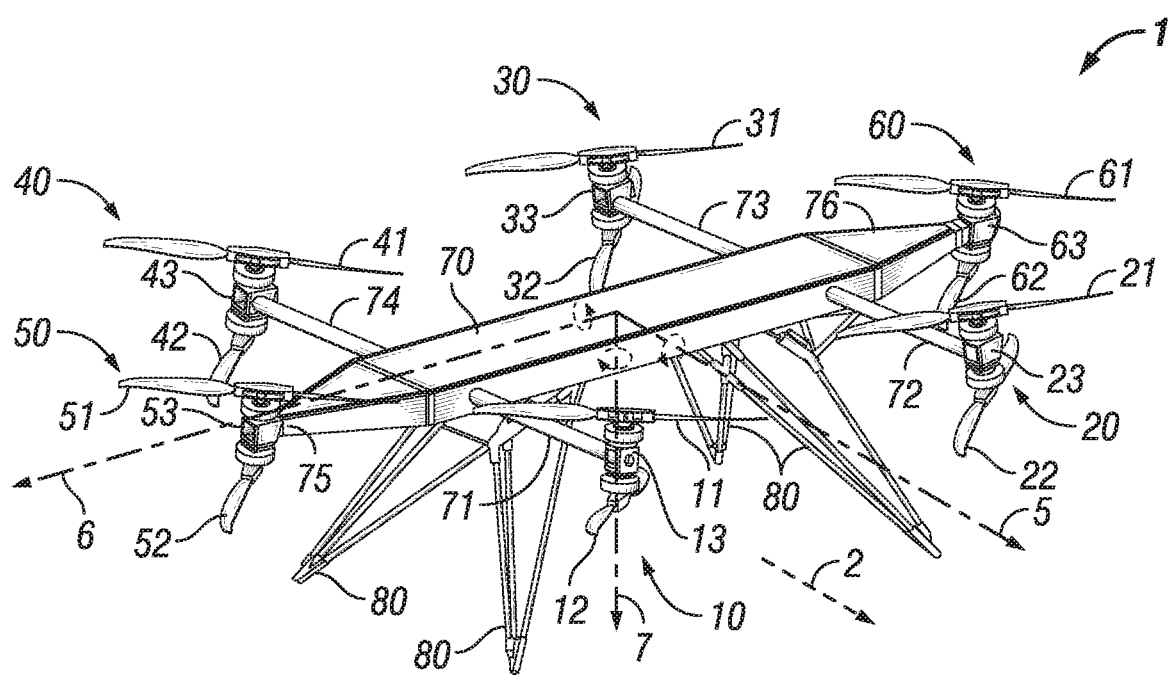
FIG. 1 shows an embodiment of a rotorcraft with canted rotors.

FIG. 1 shows a rotorcraft 1 having a frame 70, one or more supports 80, and a plurality of rotors. The plurality of rotors include at least four rotors. The at least four rotors are each canted to orient a component of the thrust produced by the rotor in a non-vertical direction for yaw control. The cant of each of the plurality of rotors may be fixed. The plurality of rotors may include a plurality of additional rotors, such as two additional rotors. The plurality of additional rotors are each canted to orient a component of thrust produced by the additional rotor in a non-vertical direction for assisting in forward movement of rotorcraft 1. The plurality of rotors includes a first rotor 10, a second rotor 20, a third rotor 30, and a fourth rotor 40. For purposes of illustration, first rotor 10, second rotor 20, third rotor 30, and fourth rotor 40 are referred to collectively as the plurality of rotors 10-40, although other embodiments may include more than four rotors. The plurality of additional rotors includes a fifth rotor 50 and a sixth rotor 60. For purposes of illustration, fifth rotor 50 and sixth rotor 60 referred to collectively as the plurality of additional rotors 50-60, although other embodiments may include more than two additional rotors. The plurality of rotors 10-40 and plurality of additional rotors 50-60 are referred to collectively as the plurality of rotors 10-60.

Rotorcraft 1 includes a roll axis 5, a pitch axis 6, and a yaw axis 7 and is operable for forward motion 2 in the direction of roll axis 5. Roll axis 5, pitch axis 6, and yaw axis 7 intersect at the center of gravity of rotorcraft 1, as would be appreciated by one of ordinary skill in the art. The one or more supports 80 may be legs and are configured to support the weight of rotorcraft 1 when not in flight. The one or more supports 80 may also provide for connection of a payload, such as, but not limited to, a package, surveillance equipment, scientific monitoring instruments, and/or camera. Rotorcraft 1 includes a power source (not shown), such as batteries, and a control module. The control module selectively directs power to one or more of the plurality of rotors 10-60 to control the roll, pitch, and yaw of rotorcraft 1. The power source and control module may be encased within frame 70.

One or more of the plurality of rotors 10-60 may be co-axial rotors. Co-axial rotors may provide redundant thrust sources in the case of mechanical failure of a rotor. As shown in FIG. 1, first rotor 10 is a co-axial rotor and includes an upper rotor 11, a lower rotor 12, and a rotor shaft 13 supporting upper rotor 11 and lower rotor 12. Second rotor 20 is a co-axial rotor and includes an upper rotor 21, a lower rotor 22, and a rotor shaft 23 supporting upper rotor 21 and lower rotor 22. Third rotor 30 is a co-axial rotor and includes an upper rotor 31, a lower rotor 32, and a rotor shaft 33 supporting upper rotor 31 and lower rotor 32. Fourth rotor 40 is a co-axial rotor and includes an upper rotor 41, a lower rotor 42, and a rotor shaft 43 supporting upper rotor 41 and lower rotor 42. Fifth rotor 50 is a co-axial rotor and includes an upper rotor 51, a lower rotor 52, and a rotor shaft 53 supporting upper rotor 51 and lower rotor 52. Sixth rotor 60 is a co-axial rotor and includes an upper rotor 61, a lower rotor 62, and a rotor shaft 63 supporting upper rotor 61 and lower rotor 62. Preferably, the rotor blades of the upper and lower rotors are fixed pitch rotor blades. As used herein, the terms "upper rotor" and "lower rotor" encompass multi-blade rotors, such as two-blade rotors, three-blade rotors, or four-blade rotors connected at a central hub to the rotor shaft. The plurality of rotors 10-60 are connected to frame 70. Frame 70 includes a first end 75, a second end 76, a front end 77 (best shown in FIG. 2), and a rear end 78 (best shown in FIG. 2). Frame 70 may include a plurality of arms 71, 72, 73, 74 spatially separating the plurality of rotors 10-40. Fifth rotor 50 may be connected to frame 70 at first end 75 and sixth rotor 60 may be connected to frame 70 at second end 76.

Figure 2:
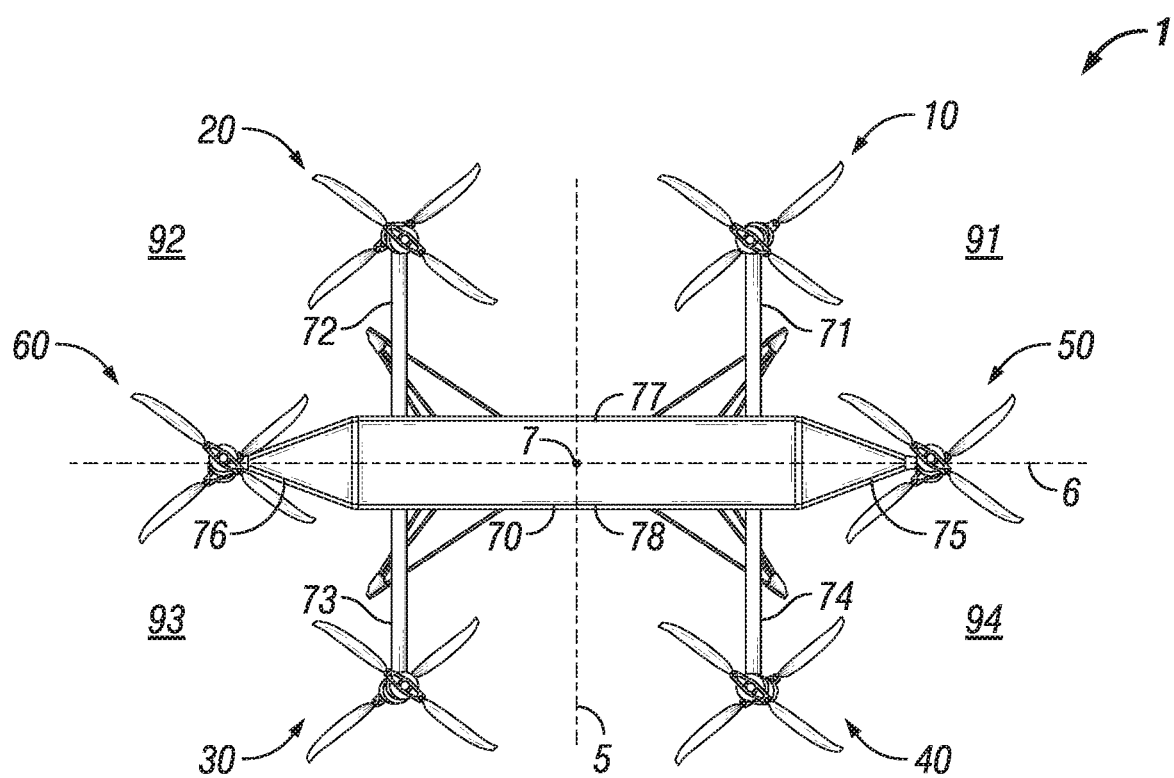
FIG. 2 shows a top view of the embodiment of FIG. 1.

FIG. 2 shows a top view of rotorcraft 1, viewed along yaw axis 7. The plurality of rotors 10-40 and the plurality of additional rotors 50-60 are oriented in a hexagon pattern. Roll axis 5 and pitch axis 6 divide rotorcraft 1 into four quadrants 91-94. A first quadrant 91 and a second quadrant 92 are on the side of pitch axis 6 with front end 77 and a third quadrant 93 and a fourth quadrant 94 are on the side of pitch axis with rear end 78. First quadrant 91 and fourth quadrant 94 are on the side of roll axis 5 with first end 75. Second quadrant 92 and third quadrant 93 are on the side of roll axis 5 with second end 76. First rotor 10 is located in first quadrant 91, second rotor 20 is located in second quadrant 92, third rotor 30 is located in third quadrant 93, and fourth rotor 40 is located in fourth quadrant 94. First rotor 10 and second rotor 20 are equidistantly positioned from roll axis 5. Third rotor 30 and fourth rotor 40 are equidistantly positioned from roll axis 5. Fifth rotor 50 and sixth rotor 60 are equidistantly positioned from roll axis 5. Fifth rotor 50 and sixth rotor 60 may be aligned along pitch axis 6. First rotor 10 and fourth rotor 40 are equidistantly positioned from pitch axis 6. Second rotor 20 and third rotor 30 are equidistantly positioned from pitch axis 6. Roll axis 5 extends along a length of frame 70 between front end 77 and rear end 78. Pitch axis 6 extends along a width of frame 70 between first end 75 and second end 76. In some embodiments, the width of frame 70 is greater than the length of frame 70. A greater width than length of frame 70 may provide additional stability by fifth rotor 50 and sixth rotor 60.

Figure 3:
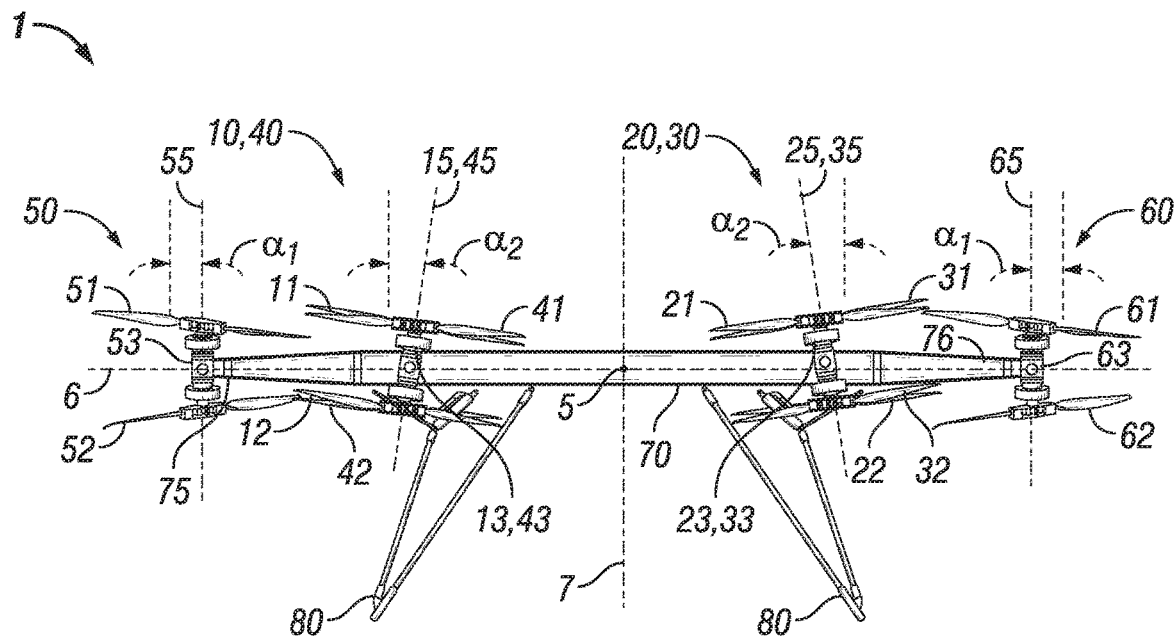
FIG. 3 shows a front view of the embodiment of FIG. 1.

FIG. 3 shows a front view of rotorcraft 1, viewed along roll axis 5. First rotor 10 includes an axis of rotation 15, second rotor 20 includes an axis of rotation 25, third rotor 30 includes an axis of rotation 35, fourth rotor 40 includes an axis of rotation 45, fifth rotor 50 includes an axis of rotation 55, and sixth rotor 60 includes an axis of rotation 65. The rotor shaft 13, 23, 33, 43 of each of the plurality of rotors 10-40 may be canted with respect to roll axis 5. Stated another way, the axes of rotation 15, 25, 35, 45 of each of the plurality of rotors 10-40 are neither parallel nor perpendicular to yaw axis 7 in a plane normal to roll axis 5 when canted with respect to roll axis 5. As discussed herein, canted with respect to roll axis 5 includes both a positive cant and a negative cant. Cant with respect to roll axis 5 is referenced for each rotor individually. A positive cant, also referred to as an inward cant, for a rotor causes the upper rotor to move closer to roll axis 5 (inward toward a plane formed of roll axis 5 and yaw axis 7). A negative cant, also referred to as outward cant, for a rotor causes the lower rotor to move closer to roll axis 5 (inward toward the plane formed of roll axis 5 and yaw axis 7). First rotor 10, second rotor 10, third rotor 30, and fourth rotor 40 are canted at an angle $\alpha_2$ in the plane normal to roll axis 5. In some embodiments, angle $\alpha_2$ is between three and fifteen degrees. In some embodiments, angle $\alpha_2$ is more than fifteen degrees. In some embodiments, angle $\alpha_2$ is between ten and fifteen degrees. In some embodiments, angle ca is between three and ten degrees. The rotor shafts 53, 63 of fifth rotor 50 and sixth rotor 60 may be parallel to yaw axis 7 in a plane normal to roll axis 5. In other words, an angle $\alpha_1$ in the plane normal to roll axis 5 may be zero or almost zero.

Figure 4:
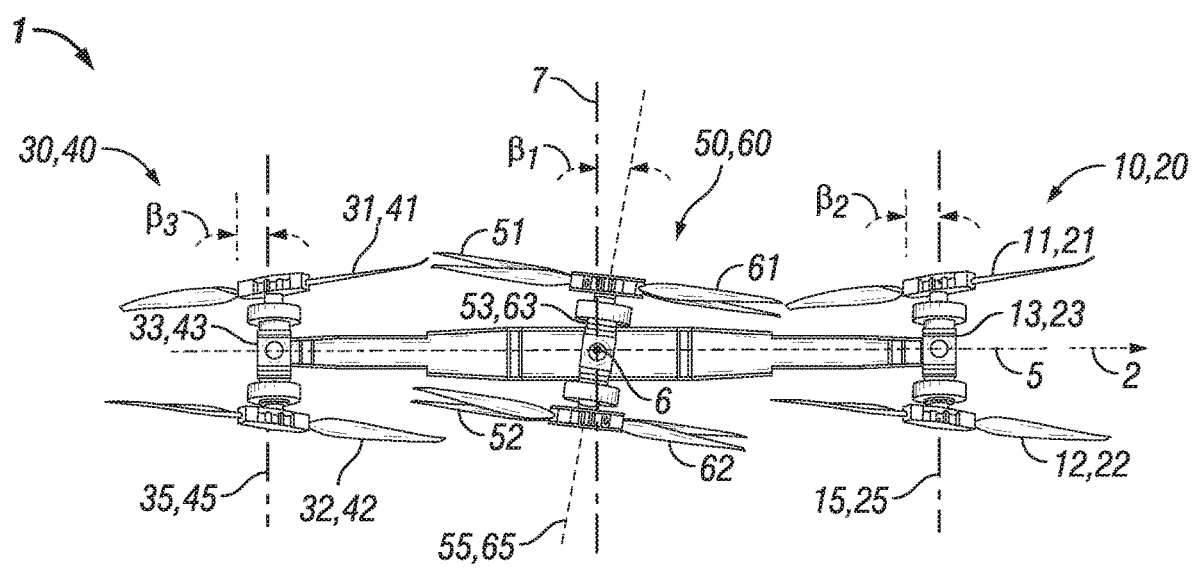
FIG. 4 shows a side view of the embodiment of FIG. 1.

FIG. 4 shows a side view of rotorcraft 1, viewed along pitch axis 6. The rotor shaft 13, 23, 33, 43 of each of the plurality of rotors 10-40 may be canted with respect to pitch axis 6. The rotor shaft 53, 63 of each of the plurality of additional rotors 50-60 may be canted with respect to pitch axis 6. Stated another way, the axes of rotation 15, 25, 35, 45 of each of the plurality of rotors 10-40 and the axes of rotation 55, 65 of rotation of each of the plurality of additional rotors 50-60 are neither parallel nor perpendicular to yaw axis 7 in a plane normal to pitch axis 6 when canted with respect to pitch axis 6. As discussed herein, canted with respect to pitch axis 6 includes both a positive cant and a negative cant. Cant with respect to pitch axis 6 is referenced with respect to rotorcraft 1 as a whole. A positive cant, also referred to as a forward cant, for a rotor causes the upper rotor to be positioned toward the direction of forward motion 2 in the direction of roll axis 5. A negative cant, also referred to a backward cant, for a rotor causes the lower rotor to be positioned toward the direction of forward motion 2 in the direction of roll axis 5.

The rotor shafts 53, 63 of fifth rotor 50 and sixth rotor 60 are positively canted at an angle $\beta_1$ in the plane normal to pitch axis 6. In some embodiments, angle $\beta_1$ is between three and fifteen degrees. In some embodiments, angle $\beta_1$ is more than fifteen degrees. In some embodiments, angle $\beta_1$ is between ten and fifteen degrees. In some embodiments, angle $\beta_1$ is between three and ten degrees. The rotor shafts 13, 23 of first rotor 10 and second rotor 20 are canted at an angle $\beta_2$ in the plane normal to pitch axis 6. In some embodiments, angle $\beta_2$ is between three and fifteen degrees. In some embodiments, angle $\beta_2$ is more than fifteen degrees. In some embodiments, angle $\beta_2$ is between ten and fifteen degrees. In some embodiments, angle $\beta_2$ is between three and ten degrees. The rotor shafts 33, 43 of third rotor 30 and fourth rotor 40 are canted at an angle $\beta_3$ in the plane normal to pitch axis 6. In some embodiments, angle $\beta_3$ is between three and fifteen degrees. In some embodiments, angle $\beta_3$ is more than fifteen degrees. In some embodiments, angle $\beta_3$ is between ten and fifteen degrees. In some embodiments, angle $\beta_3$ is between three and ten degrees.

Figure 11:
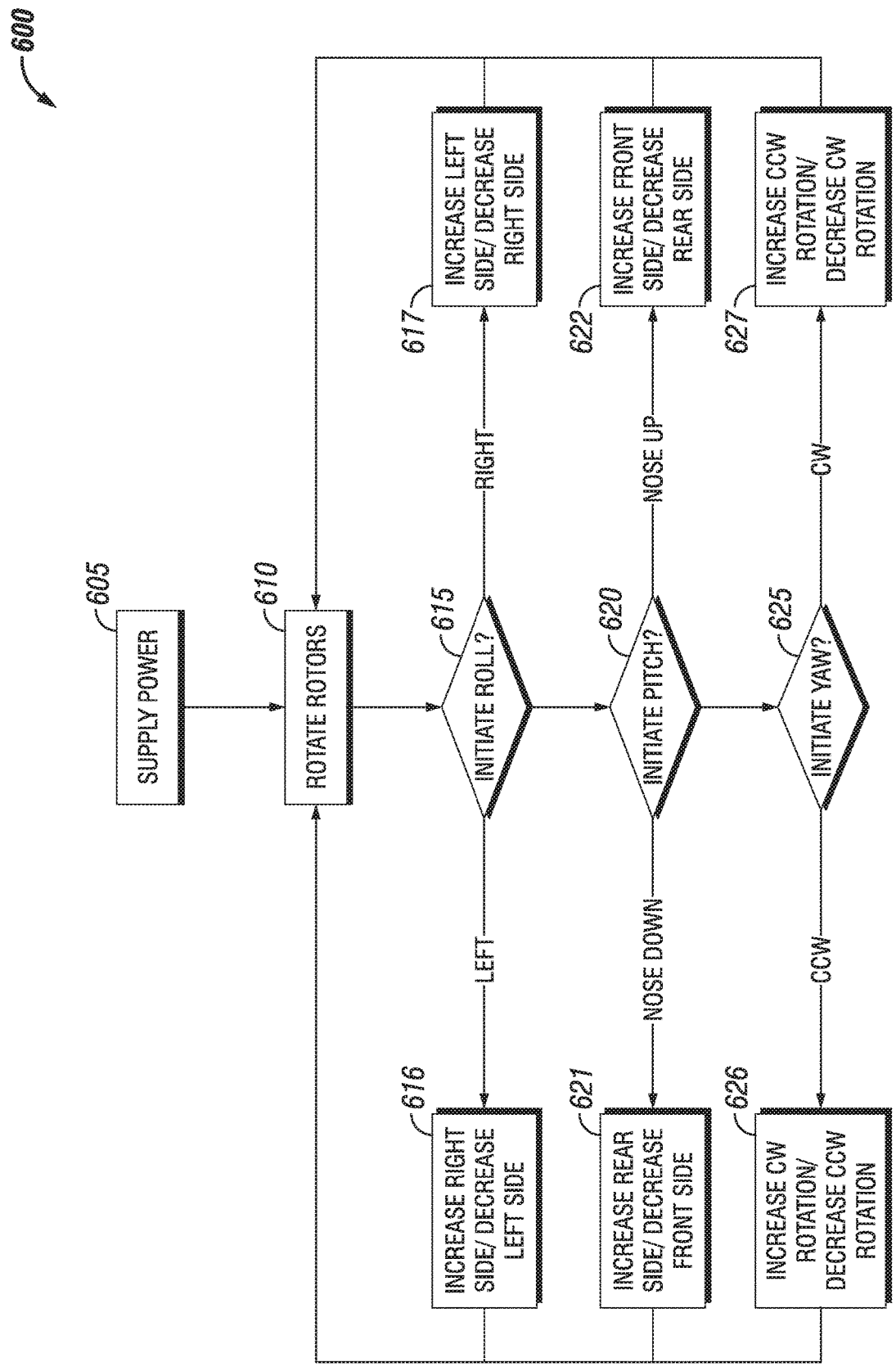
FIG. 11 is a flow diagram of an embodiment of a method of operating a rotorcraft.

FIG. 11 is a flow diagram of an embodiment of a method 600 of operating a rotorcraft. Method 600 includes supplying power to at least four rotors of a rotorcraft in Action 605 and causing the at least four rotors to rotate in Action 610. The at least four rotors each have an axis of rotation that is non-parallel and non-perpendicular to a yaw axis of the rotorcraft. The at least four rotors include at least two opposing pairs of rotors. An opposing first pair of rotors of the at least two opposing pairs includes a first rotor and a third rotor on opposite sides of both a roll axis and a pitch axis of the rotorcraft. An opposing second pair of rotors of the at least two opposing pairs includes a second rotor and a fourth rotor on opposite sides of both the roll axis and the pitch axis. Action 610 includes causing the opposing first pair of rotors to rotate in a counter-clockwise direction and causing the opposing second pair of rotors to rotate in a clockwise direction.

Each of the at least four rotors may be a co-axial co-rotating rotor and Action 610 may include causing the rotors of each co-axial rotor to rotate in the same direction around the axis of rotation of the co-axial rotor. Method 600 may include supplying power to at least two additional rotors of the rotorcraft. The at least two additional rotors each include an axis of rotation having a forward cant with respect to the pitch axis. Each of the at least two additional rotors may be a co-axial contra-rotating rotor and Action 610 may include causing the rotors of each contra-rotating co-axial rotor to rotate in opposite directions around the axis of rotation the co-axial rotor.

Method 600 may include initiating a yaw maneuver, initiating a roll maneuver, and/or initiating a pitch maneuver. To initiate a roll maneuver, a processor determines when a request to initiate a roll maneuver has been received in Action 615. If the request to initiate a roll maneuver is to roll to the left, Action 616 includes increasing the rotational speed of the rotors on the right side of the roll axis and/or decreasing the rotational speed of the rotors on the left side of the roll axis. If the request to initiate a roll maneuver is to roll to the right, Action 617 includes increasing the rotational speed of the rotors on the left side of the roll axis and/or decreasing the rotational speed of the rotors on the right side of the roll axis. The increase may be proportional to the decrease to maintain non-roll control characteristics of the rotorcraft.

To initiate a pitch maneuver, the processor determines when a request to initiate a pitch maneuver has been received in Action 620. If the request to initiate a pitch maneuver is to pitch the nose downward, Action 621 includes increasing the rotational speed of the rotors on the rear side of the pitch axis and/or decreasing the rotational speed of the rotors on the front side of the pitch axis. If the request to initiate a pitch maneuver is to pitch the nose upward, Action 622 includes increasing the rotational speed of the rotors on the front side of the pitch axis and/or decreasing the rotational speed of the rotors on the rear side of the pitch axis. The increase may be proportional to the decrease to maintain non-pitch control characteristics of the rotorcraft.

To initiate a yaw maneuver, the processor determines when a request to initiate a yaw maneuver has been received in Action 625. If the request to initiate a yaw maneuver is to yaw counter-clockwise, Action 626 includes increasing the rotational speed of the clockwise-rotating rotors and/or decreasing the rotational speed of the counter-clockwise-rotating rotors. If the request to initiate a yaw maneuver is to yaw clockwise, Action 627 includes increasing the rotational speed of the counter-clockwise-rotating rotors and/or decreasing the rotational speed of the clockwise-rotating rotors. The increase may be proportional to the decrease to maintain non-yaw control characteristics of the rotorcraft. In embodiments where the opposing first pair of rotors rotate in a counter-clockwise direction, a yawing maneuver includes increasing a rotational speed of the opposing first pair of rotors in order to yaw clockwise. The increased rotational speed produces a thrust by the opposing first pair of rotors with a component of the thrust oriented non-parallel to the yaw axis. The component of the thrust may be oriented perpendicular to an imaginary ray extending from the yaw axis.

Figure 5:
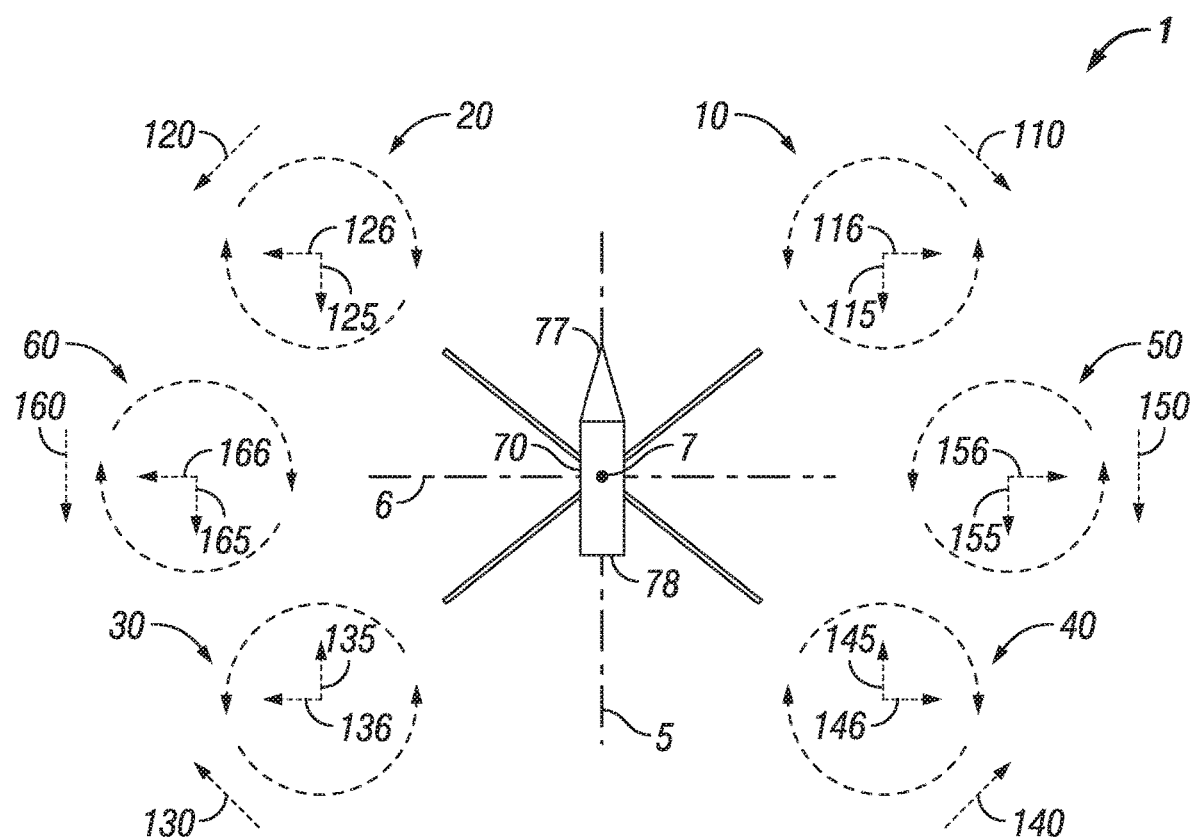
FIG. 5 is a schematic representation of a rotorcraft with canted rotors.

For purposes of illustration, rotorcraft 1 may be utilized with method 600, but method 600 may also be utilized with other embodiments as would be appreciated by a skilled person after studying the configurations, examples, and arrangements described herein. FIG. 5 is a schematic representation of rotorcraft 1. The plurality of rotors 10-40 are oriented in opposing pairs across frame 70. First rotor 10 and third rotor 30 form an opposing first pair of rotors. Second rotor 20 and fourth rotor 40 form an opposing second pair of rotors. Each of the plurality of rotors 10-60 creates a vertical thrust to lift rotorcraft 1. In order to control the roll of rotorcraft 1, the relative rotational speed of first rotor 10 and fourth rotor 40 to second rotor 20 and third rotor 30 is altered. More vertical thrust is created on one side of roll axis 5 of rotorcraft 1 and causes rotorcraft 1 to roll about roll axis 5. In order to control the pitch of rotorcraft 1, the relative rotational speed of first rotor 10 and second rotor 20 to third rotor 30 and fourth rotor 40 is altered. More vertical thrust is created on one side of pitch axis 6 and causes rotorcraft 1 to pitch about pitch axis 6.

Each of the plurality of rotors 10-60 creates a torque upon frame 70 of rotorcraft 1 that opposes the rotation of the rotor. First rotor 10 creates a rotor torque 110, second rotor 20 creates a rotor torque 120, third rotor 30 creates a rotor torque 130, fourth rotor 40 creates a rotor torque 140, fifth rotor 50 creates a rotor torque 150, and sixth rotor 60 creates a rotor torque 160. By way of example, first rotor 10 may rotate counter-clockwise and rotor torque 110 exerted upon frame 70 by rotation of first rotor 10 is in a direction that would cause clockwise rotation of frame 70 to oppose the counter-clockwise rotation of first rotor 10. The magnitudes of rotor torque 110, rotor torque 120, rotor torque 130, rotor torque 140, rotor torque 150, and rotor torque 160 increase with rotational speed of their respective rotors. When each of the plurality of rotors 10-40 is rotating at the same speed, the rotor torques are symmetrical and do not yaw rotorcraft 1.

In order to control the yaw of rotorcraft 1, the relative rotational speed of the opposing first pair of rotors (first rotor 10 and third rotor 30) to the opposing second pair of rotors (second rotor 20 and fourth rotor 40) is altered and creates asymmetrical rotor torques, which changes the angular momentum of rotorcraft 1. As angular momentum is conserved, rotorcraft 1 is yawed to balance the system. For example, if the rotational speed of the counter-clockwise rotating first pair of rotors is decreased and the rotational speed of the clockwise rotating second pair of rotors is increased, an angular velocity is produced on rotorcraft 1 in a counter-clockwise direction to balance the overall angular momentum of rotorcraft 1. If the rotational speed of the counter-clockwise rotating first pair of rotors is increased and the rotational speed of the clockwise rotating second pair of rotors is decreased, an angular velocity is produced on rotorcraft 1 in a clockwise direction to balance the overall angular momentum of rotorcraft 1.

The rotational velocity of the yawing movement is dependent upon the moment of inertia of a rotorcraft. However, rotorcrafts having a larger mass and/or larger rotor blades have an increased moment of inertia. Larger rotor blades generally require greater amount of power to induce rotational motion. Increases in rotational speed may be less slowly achieved as compared to smaller, multi-rotor rotorcrafts. Additionally, rotorcrafts with a larger mass require greater forces acting upon the rotorcraft to induce a yawing motion. Accordingly, greater amounts of power are needed to increase the rotational speed of these rotors and these rotorcrafts may yaw less quickly. For instance, rotorcrafts having a gross weight of 226.8 kilograms (500 pounds) or more, a rotor diameter of 1 meter or greater, and/or generating lift sufficient to support a payload capacity of between 45.4 and 354 kilograms (100-1000 pounds) may particularly benefit from increased yaw control and reduced power consumption. As a rotorcraft's moment of inertia increases, the differential torque created by rotation of non-canted rotors becomes less effective in controlling yaw of the rotorcraft. Reduced power consumption of a system may increase payload capacity and/or range of a rotorcraft. After studying the configurations, examples, and arrangements described herein a skilled person may come to understand that smaller rotorcrafts may also benefit to a degree. Furthermore, the skilled person may come to understand that gross weight, rotor diameter, and/or payload capacity may be selected for a desired application. For example, some applications may permit use of additional smaller-sized rotors to generate the same payload capacity; some applications may use materials creating a larger gross weight but with a more limited payload capacity; other applications may desire the largest ratio of payload capacity to gross weight.

The plurality of rotors 10-40 are canted with respect to roll axis 5 and/or with respect to pitch axis 6. The canted rotors provide components of thrust that is non-parallel and non-perpendicular to yaw axis 7. The thrust can be subdivided into a vertical thrust component for lift that is parallel to yaw axis 7, a forward thrust component that is parallel to roll axis 5, and a side thrust component that is parallel to pitch axis 6. The vertical thrust component is reduced compared to a non-canted rotor but the forward thrust component and/or side thrust component may be utilized for increased yaw control and/or forward travel. The side thrust component and distance from pitch axis 6 creates a side thrust-based torque. The forward thrust component and distance from roll axis 5 creates a forward thrust-based torque. The direction of cant of the plurality of rotors 10-40 is dependent upon their direction of rotation. The forward thrust-based torque and the side thrust-based torque are oriented in a direction to supplement the rotor torque when a yawing maneuver is performed. The forward thrust-based torque and the side thrust-based torque enable the plurality of rotors 10-40 to yaw at the same rate as a rotorcraft with non-canted rotors, but at a lower rotational speed. For example, to increase a yawing rate by a requested degree per second over a desired time, a rotorcraft with non-canted rotors may utilize a change in rotational speed, such as 100 revolutions per minute ("RPM"), whereas a rotorcraft with canted rotors may utilize a lesser change in rotational speed, such as 60 RPM.

With reference to FIGS. 4 and 5, a forward thrust component 115 of first rotor 10 is determined by angle $\beta_2$ of rotor shaft 13, a forward thrust component 125 of second rotor 20 is determined by angle $\beta_2$ of rotor shaft 23, a forward thrust component 135 of third rotor 30 is determined by angle $\beta_3$ of rotor shaft 33, and a forward thrust component 145 of fourth rotor 40 is determined by angle $\beta_3$ of rotor shaft 43. A forward thrust component 155 of fifth rotor 50 is determined by angle $\beta_1$ of rotor shaft 53 and a forward thrust component 165 of sixth rotor 60 is determined by angle $\beta_1$ of rotor shaft 63.

With reference to FIGS. 3 and 5, a side thrust component 116 of first rotor 10 is determined by angle $\alpha_2$ of rotor shaft 13, a side thrust component 126 of second rotor 20 is determined by angle $\alpha_2$ of rotor shaft 23, a side thrust component 136 of third rotor 30 is determined by angle $\alpha_2$ of rotor shaft 33, and a side thrust component 146 of fourth rotor 40 is determined by angle $\alpha_2$ of rotor shaft 43. A side thrust component 156 of fifth rotor 50 is determined by angle $\alpha_1$ of rotor shaft 53 and a side thrust component 166 of sixth rotor 60 is determined by angle $\alpha_1$ of rotor shaft 63. Side thrust component 116, side thrust component 126, side thrust component 136, side thrust component 146, side thrust component 156, and side thrust component 166 are each magnified by their distance from pitch axis 6 to create a thrust-based torque on rotorcraft 1. Forward thrust component 115, forward thrust component 125, forward thrust component 135, forward thrust component 145 forward thrust component 155, and forward thrust component 165 are each magnified by their distance from roll axis 5 to create a thrust-based torque on rotorcraft 1.

Forward thrust component 155 of fifth rotor 50 and forward thrust component 165 of sixth rotor 60 are oriented parallel to roll axis 5 to assist with forward movement of rotorcraft 1. In addition, the orientation of fifth rotor 50 and sixth rotor 60 may reduce nose-down tilt with forward speed. When the opposing first pair of rotors (first rotor 10 and third rotor 30) is rotating at the same speed as the opposing second pair of rotors (second rotor 20 and fourth rotor 40), the thrust components of the first and second pairs of rotors are symmetrical. More particularly, side thrust component 116 and side thrust component 136 of the first pair of rotors balances side thrust component 126 and side thrust component 146 of the second pair of rotors, and forward thrust component 115 and forward thrust component 135 of the first pair of rotors balances forward thrust component 125 and forward thrust component 145 of the second pair of rotors. As discussed above, when control for a yawing maneuver is initiated, the relative rotational speed of the opposing first pair of rotors (first rotor 10 and third rotor 30) to the opposing second pair of rotors (second rotor 20 and fourth rotor 40) is altered. The magnitudes of the thrust components increase with rotational speed of their respective rotors.

In controlling the yaw of rotorcraft 1, the thrust components of the plurality of rotors 10-40 supplement the rotor torques of the plurality of rotors 10-40 and cause rotorcraft 1 to rotate around yaw axis 7. As the rotational speed of the counter-clockwise rotating opposing first pair of rotors (first rotor 10 and third rotor 30) is decreased and the rotational speed of the clockwise rotating opposing second pair of rotors (second rotor 20 and fourth rotor 40) is increased, rotor torque 110 and rotor torque 130 are decreased and rotor torque 120 and rotor torque 140 are increased. Additionally, the magnitudes of side thrust component 116, side thrust component 136, forward thrust component 115, and forward thrust component 135 increase, and the magnitudes of side thrust component 126, side thrust component 146, forward thrust component 125, and forward thrust component 145 decrease. The unbalanced thrust components produce asymmetrical thrust-based torques on rotorcraft 1 that supplement the asymmetrical rotor torques, which moves rotorcraft 1 in a counter-clockwise direction.

In some embodiments, the magnitude of angle $\alpha_2$ (shown in FIG. 3) is equal to the magnitude of angle $\beta_2$ and the magnitude of angle $\beta_3$ (shown in FIG. 4). When the magnitude of angle $\alpha_2$ is equal to the magnitude of angle $\beta_2$ and the magnitude of angle $\beta_3$, and each of the plurality of rotors 10-40 are equidistantly positioned from the center of gravity, the corresponding thrust component of a rotor is oriented perpendicular to an imaginary ray extending from yaw axis 7 and the center of gravity of rotorcraft 1. As shown in the schematic representation of FIG. 7, imaginary rays 211, 221, 231, 241, 251, 261 extend from yaw axis 7 through a respective one of first rotor 10, second rotor 20, third rotor 30, fourth rotor 40, fifth rotor 50, and sixth rotor 60 and oriented perpendicular to the corresponding thrust component 210, 220, 230, 240, 250, 260 of those rotors. When the thrust component is oriented perpendicularly, the thrust-based torque created may be maximized. It is appreciated that in some embodiments, the plurality of rotors 10-40 may not be angularly offset in ninety degree increments and/or the rotorcraft may include more than four rotors. Nevertheless, the rotors may still be oriented perpendicular to an imaginary ray extending from the center of gravity of the rotorcraft. By way of example, additional rotors may be positioned around frame 70 in opposing pairs.

The magnitudes of cant angles $\alpha_1$, $\alpha_2$, $\beta_1$, $\beta_2$, and $\beta_3$ may be selected for desired applications. For instance, larger cant angles reduce the vertical thrust created to lift the rotorcraft. Larger magnitudes of angles $\alpha_2$, $\beta_2$, and $\beta_3$ of the rotors provide greater thrust perpendicular to lift and may allow for faster yawing or greater control with larger payloads. Larger magnitudes of angle $\beta_1$ provides additional thrust in a forward direction. In addition, disc loading of a rotor may be selected based upon the desired applications and the cant of the rotors.

Figure 6:
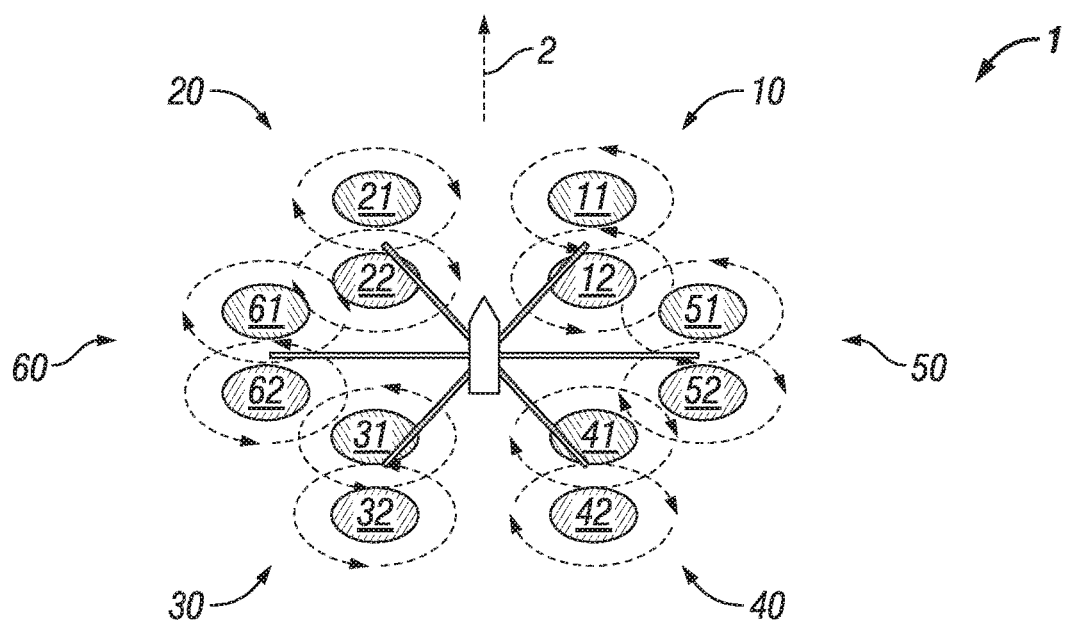
FIG. 6 is a schematic representation of the embodiment of FIG. 1.

FIG. 6 shows a schematic representation of one embodiment of a rotor layout for rotorcraft 1. First rotor 10 and third rotor 30 form the opposing first pair of rotors. First rotor 10 is a co-axial co-rotating rotor with upper rotor 11 and lower rotor 12 both rotating in the same direction. Third rotor 30 is a co-axial co-rotating rotor with upper rotor 31 and lower rotor 32 both rotating in the same direction. Both first rotor 10 and third rotor 30 rotate in the same direction. Second rotor 20 and fourth rotor 40 form the opposing second pair of rotors. Second rotor 20 is a co-axial co-rotating rotor with upper rotor 21 and lower rotor 22 both rotating in the same direction. Fourth rotor 40 is a co-axial co-rotating rotor with upper rotor 41 and lower rotor 42 rotating in the same direction. Both second rotor 20 and fourth rotor 40 rotate in the same direction. The opposing first pair of rotors (first rotor 10 and third rotor 30) may rotate in a counter-clockwise direction and the opposing second pair of rotors (second rotor 20 and fourth rotor 40) may rotated in a clockwise direction, or vice versa. Fifth rotor 50 is a co-axial contra-rotating rotor with upper rotor 51 and lower rotor 52 rotating in opposite directions. Sixth rotor 60 is a co-axial contra-rotating rotor with upper rotor 61 and lower rotor 62 rotating in opposite directions. The opposite-rotating rotors of a co-axial contra-rotating rotor produce rotor torques in opposite directions so that a symmetrical torque is created by the rotor. Rotor torque 150 from the co-axial contra-rotating fifth rotor 50 and rotor torque 160 from the co-axial contra-rotating sixth rotor 60 (shown in FIG. 5) is lessened or eliminated compared to a single rotor or co-axial co-rotating rotors. Co-axial co-rotating rotors may provide reduced rotor noise compared to co-axial contra-rotating rotors.

Figure 7:
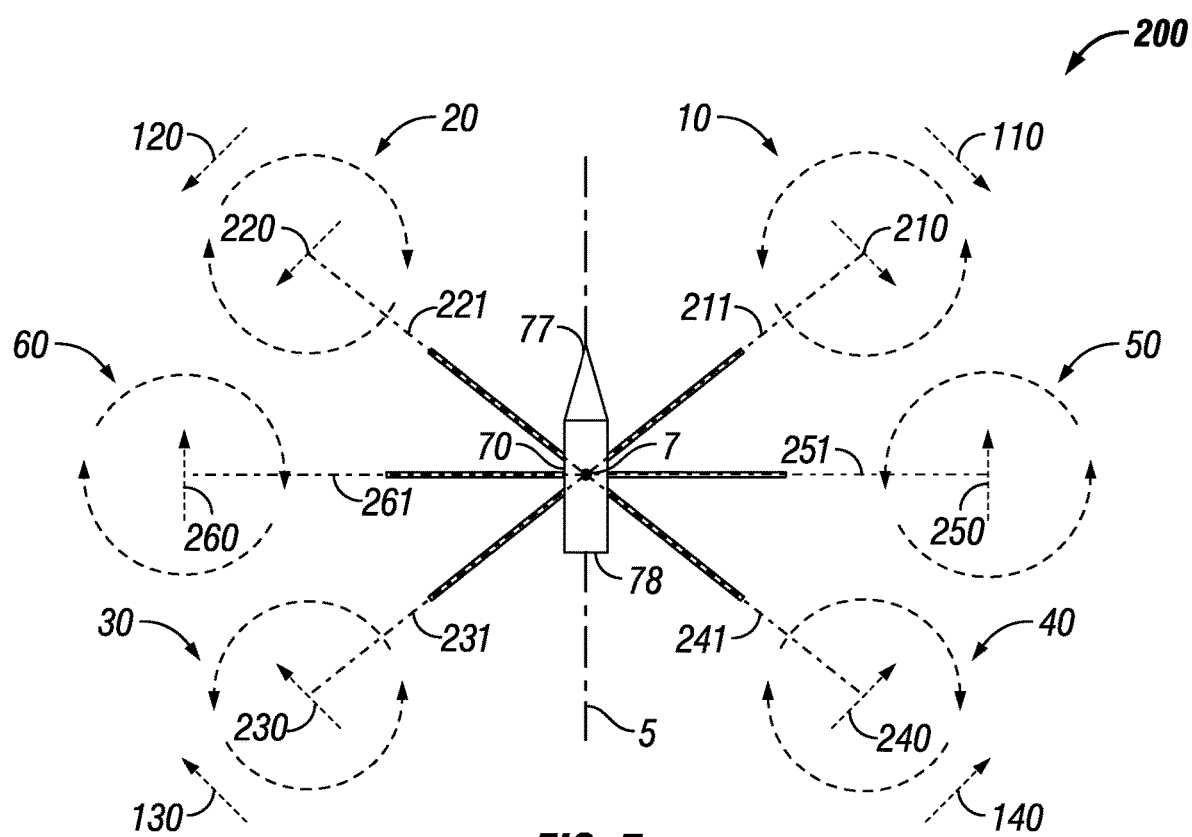
FIG. 7 is a schematic representation of a rotorcraft in a first configuration.

FIG. 7 is a schematic representation of a rotorcraft 200. Rotorcraft 200 includes a first rotor 10, a second rotor 20, a third rotor 30, a fourth rotor 40, a fifth rotor 50, and a sixth rotor 60, as described above with respect to FIGS. 1-6, but with cant angles $\alpha_1$, $\alpha_2$, $\beta_1$, $\beta_2$, and $\beta_3$ set according to one embodiment. First rotor 10 and third rotor 30 form a first pair of rotors. Second rotor 20 and fourth rotor 40 form a second pair of rotors.

With reference to FIGS. 3 and 7, angle $\alpha_1$ of fifth rotor 50 and sixth rotor 60 is zero. Angle $\alpha_2$ of first rotor 10, second rotor 20, third rotor 30, and fourth rotor 40 is an outward cant. With reference to FIGS. 4 and 7, angle $\beta_1$ of fifth rotor 50 and sixth rotor 60 is forward cant. Angle $\beta_2$ of first rotor 10 and second rotor 20 is backward cant. Angle $\beta_3$ of third rotor 30 and fourth rotor 40 is forward cant. The magnitude of angle $\beta_2$ is preferably equal to the magnitude of angle $\beta_3$. First rotor 10 produces a thrust component 210, second rotor 20 produces a thrust component 220, third rotor 30 produces a thrust component 230, and fourth rotor 40 produces a thrust component 240. Fifth rotor 50 produces a thrust component 250 and sixth rotor 60 produces a thrust component 260. Thrust component 250 and thrust component 260 assist with forward movement of rotorcraft 200.

In controlling the yaw of rotorcraft 200, the thrust components of the plurality of rotors 10-40 supplement the rotor torques of the plurality of rotors 10-40 and cause rotorcraft 200 to yaw around yaw axis 7. As the rotational speed of the counter-clockwise rotating opposing first pair of rotors (first rotor 10 and third rotor 30) is decreased and the rotational speed of the clockwise rotating opposing second pair of rotors (second rotor 20 and fourth rotor 40) is increased, rotor torque 110 and rotor torque 130 are decreased and rotor torque 120 and rotor torque 140 are increased. Additionally, the magnitudes of thrust component 220 and thrust component 240 increase, and the magnitudes of thrust component 210 and thrust component 230 decrease. The unbalanced thrust components produce asymmetrical thrust-based torques on rotorcraft 200 that supplements the asymmetrical rotor torques, which moves rotorcraft 200 in a counter-clockwise direction.

Figure 8:
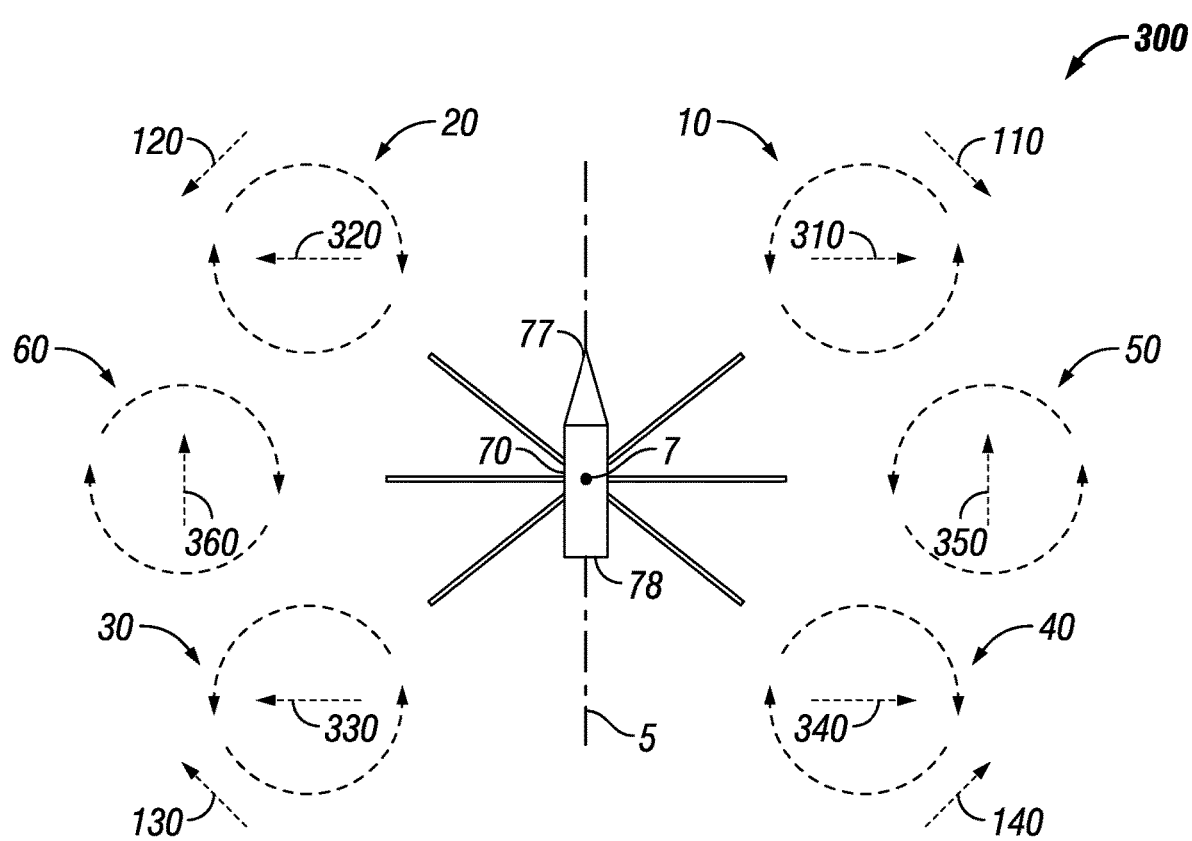
FIG. 8 is a schematic representation of a rotorcraft in a second configuration.

FIG. 8 is a schematic representation of a rotorcraft 300. Rotorcraft 300 includes a first rotor 10, a second rotor 20, a third rotor 30, a fourth rotor 40, a fifth rotor 50, and a sixth rotor 60, as described above with respect to FIGS. 1-6, but with cant angles $\alpha_1$, $\alpha_2$, $\beta_1$, $\beta_2$, and $\beta_3$ set according to one embodiment. First rotor 10 and third rotor 30 form a first pair of rotors. Second rotor 20 and fourth rotor 40 form a second pair of rotors.

With reference to FIGS. 3 and 8, angle $\alpha_1$ of fifth rotor 50 and sixth rotor 60 is zero. Angle $\alpha_2$ of first rotor 10, second rotor 20, third rotor 30, and fourth rotor 40 is an outward cant. With reference to FIGS. 4 and 8, angle $\beta_1$ of fifth rotor 50 and sixth rotor 60 is forward cant. Angle $\beta_2$ of first rotor 10 and second rotor 20 is zero. Angle $\beta_3$ of third rotor 30 and fourth rotor 40 is zero. First rotor 10 produces a side thrust component 310, second rotor 20 produces a side thrust component 320, third rotor 30 produces a side thrust component 330, and fourth rotor 40 produces a side thrust component 340. Fifth rotor 50 produces a forward thrust component 350 and sixth rotor 60 produces a forward thrust component 360. Forward thrust component 350 and forward thrust component 360 assist with forward movement of rotorcraft 300.

In controlling the yaw of rotorcraft 300, the side thrust components of the plurality of rotors 10-40 supplement the rotor torques of the plurality of rotors 10-40 and cause rotorcraft 300 to yaw around yaw axis 7. As the rotational speed of the counter-clockwise rotating opposing first pair of rotors (first rotor 10 and third rotor 30) is decreased and the rotational speed of the clockwise rotating opposing second pair of rotors (second rotor 20 and fourth rotor 40) is increased, rotor torque 110 and rotor torque 130 are decreased and rotor torque 120 and rotor torque 140 are increased. Additionally, the magnitudes of side thrust component 320 and side thrust component 340 increase, and the magnitudes of side thrust component 310 and thrust component 330 decrease. The unbalanced side thrust components produce asymmetrical thrust-based torques on rotorcraft 300 that supplements the asymmetrical rotor torques, which moves rotorcraft 300 in a counter-clockwise direction. Fifth rotor 50 produces a thrust component 350 and sixth rotor 60 produces a thrust component 360. Thrust component 350 and thrust component 360 assist with forward movement of rotorcraft 300.

Figure 9:
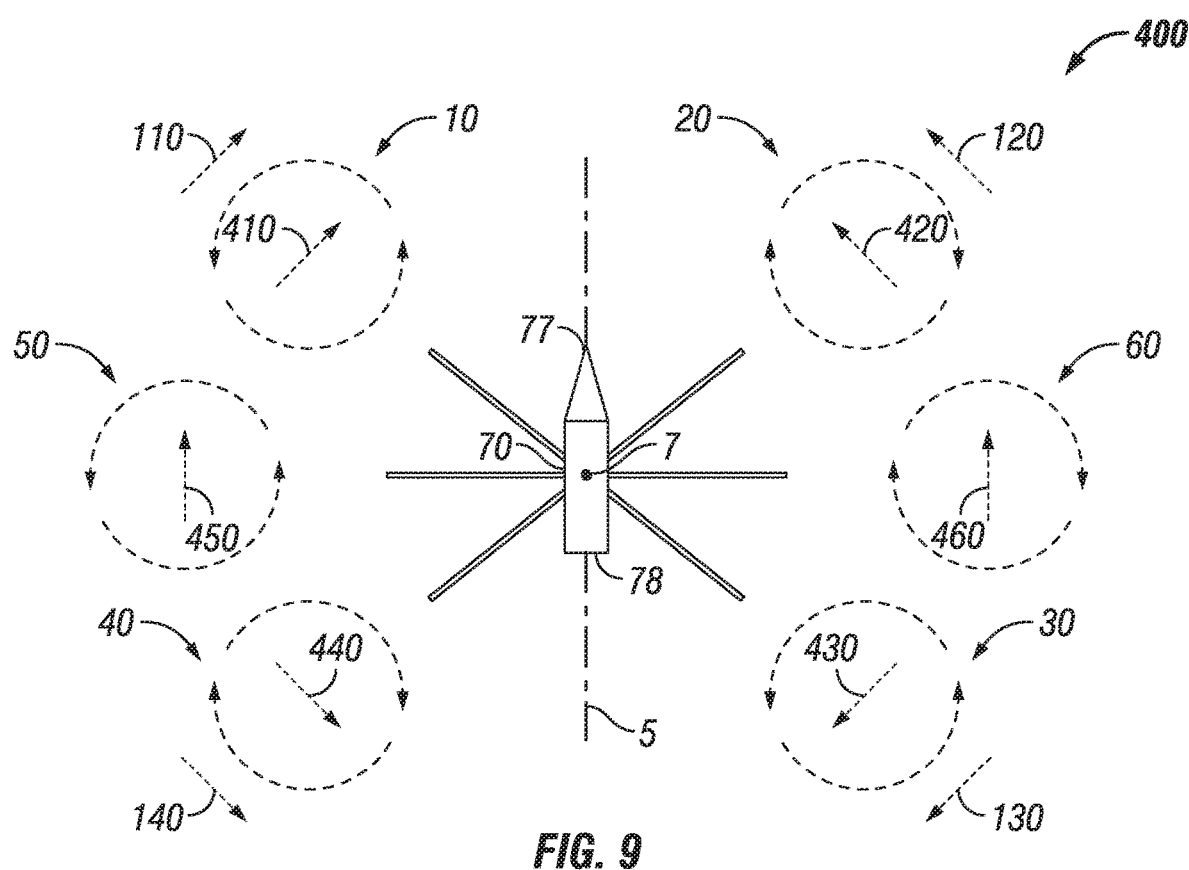
FIG. 9 is a schematic representation of a rotorcraft in a third configuration.

FIG. 9 is a schematic representation of a rotorcraft 400. Rotorcraft 400 includes a first rotor 10, a second rotor 20, a third rotor 30, a fourth rotor 40, a fifth rotor 50, and a sixth rotor 60, as described above with respect to FIGS. 1-6. Rotorcraft 400 differs from rotorcraft 1, however, with the rotation of the rotors being reversed and cant angles $\alpha_1$, $\alpha_2$, $\beta_1$, $\beta_2$, and $\beta_3$ set according to one embodiment. For purposes of illustration, rotorcraft 400 has been shown as a mirror image of rotorcraft 1 across roll axis 5. First rotor 10 and third rotor 30 form a first pair of rotors. Second rotor 20 and fourth rotor 40 form a second pair of rotors.

With reference to FIGS. 3 and 9, angle $\alpha_1$ of fifth rotor 50 and sixth rotor 60 is zero. Angle $\alpha_2$ of first rotor 10, second rotor 20, third rotor 30, and fourth rotor 40 is an inward cant. With reference to FIGS. 4 and 9, angle $\beta_1$ of fifth rotor 50 and sixth rotor 60 is forward cant. Angle $\beta_2$ of first rotor 10 and second rotor 20 is forward cant. Angle $\beta_3$ of third rotor 30 and fourth rotor 40 is backward cant. The magnitude of angle $\beta_2$ is preferably equal to the magnitude of angle $\beta_3$. First rotor 10 produces a thrust component 410, second rotor 20 produces a thrust component 420, third rotor 30 produces a thrust component 430, and fourth rotor 40 produces a thrust component 440. Fifth rotor 50 produces a thrust component 450 and sixth rotor 60 produces a thrust component 460. Thrust component 450 and thrust component 460 assist with forward movement of rotorcraft 400.

In controlling the yaw of rotorcraft 400, the thrust components of the plurality of rotors 10-40 supplement the rotor torques of the plurality of rotors 10-40 and cause rotorcraft 400 to yaw around yaw axis 7. As the rotational speed of the counter-clockwise rotating opposing first pair of rotors (first rotor 10 and third rotor 30) is decreased and the rotational speed of the clockwise rotating opposing second pair of rotors (second rotor 20 and fourth rotor 40) is increased, rotor torque 110 and rotor torque 130 are decreased and rotor torque 120 and rotor torque 140 are increased. Additionally, the magnitudes of thrust component 420 and thrust component 440 increase, and the magnitudes of thrust component 410 and thrust component 430 decrease. The unbalanced thrust components produce asymmetrical thrust-based torques on rotorcraft 400 that supplements the asymmetrical rotor torques, which moves rotorcraft 400 in a counter-clockwise direction.

Figure 10:
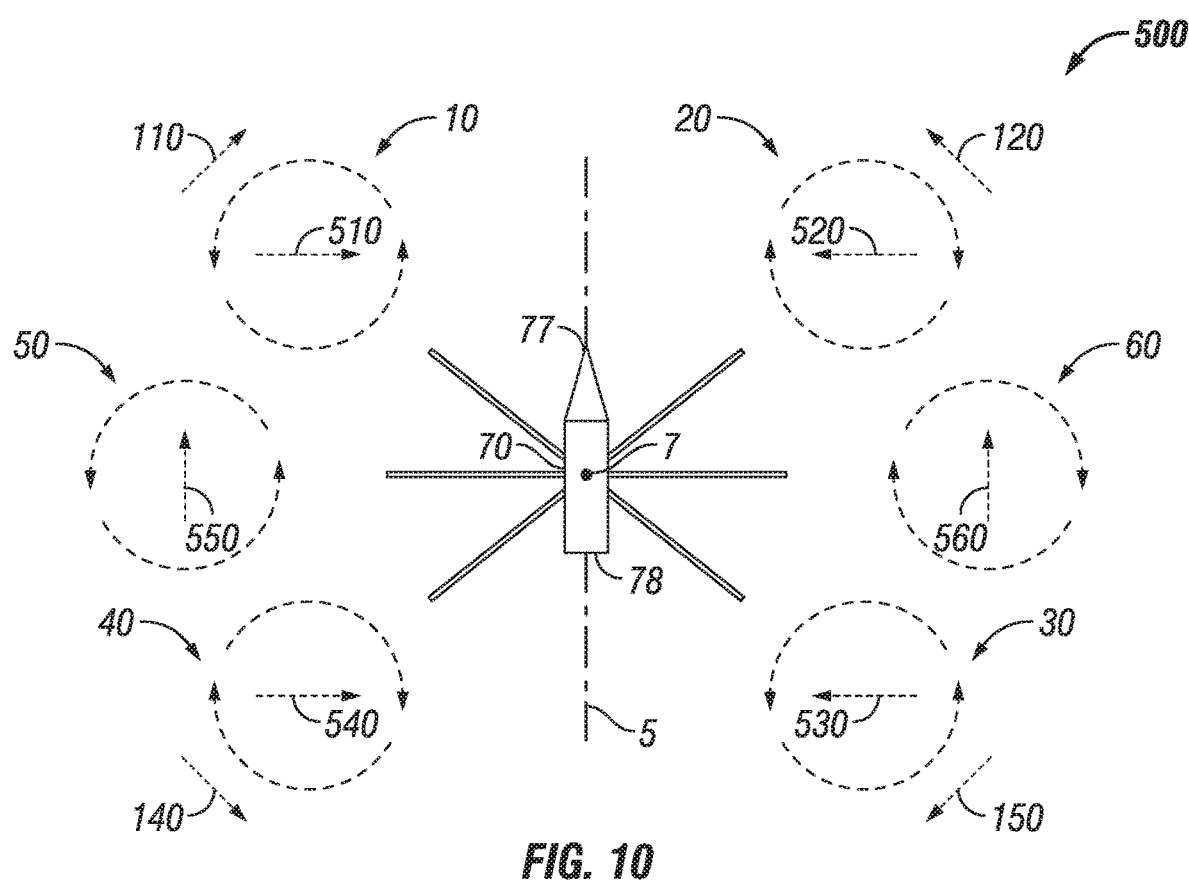
FIG. 10 is a schematic representation of a rotorcraft in a fourth configuration.

FIG. 10 is a schematic representation of a rotorcraft 500. Rotorcraft 500 includes a first rotor 10, a second rotor 20, a third rotor 30, a fourth rotor 40, a fifth rotor 50, and a sixth rotor 60, as described above with respect to FIGS. 1-6. Rotorcraft 500 differs from rotorcraft 1, however, with the rotation of the rotors being reversed and cant angles $\alpha_1$, $\alpha_2$, $\beta_1$, $\beta_2$, and $\beta_3$ set according to one embodiment. For purposes of illustration, rotorcraft 500 has been shown as a mirror image of rotorcraft 1 across roll axis 5. First rotor 10 and third rotor 30 form a first pair of rotors. Second rotor 20 and fourth rotor 40 form a second pair of rotors.

With reference to FIGS. 3 and 10, angle $\alpha t$ of fifth rotor 50 and sixth rotor 60 is zero. Angle $\alpha_2$ of first rotor 10, second rotor 20, third rotor 30, and fourth rotor 40 is an inward cant. With reference to FIGS. 4 and 10, angle $\beta_1$ of fifth rotor 50 and sixth rotor 60 is forward cant. Angle $\beta_2$ of first rotor 10 and second rotor 20 is zero. Angle $\beta_3$ of third rotor 30 and fourth rotor 40 is zero. First rotor 10 produces a side thrust component 510, second rotor 20 produces a side thrust component 520, third rotor 30 produces a side thrust component 530, and fourth rotor 40 produces a side thrust component 540. Fifth rotor 50 produces a forward thrust component 550 and sixth rotor 60 produces a forward thrust component 560. Forward thrust component 550 and forward thrust component 560 assist with forward movement of rotorcraft 500.

In controlling the yaw of rotorcraft 500, the side thrust components of the plurality of rotors 10-40 supplement the rotor torques of the plurality of rotors 10-40 and cause rotorcraft 500 to yaw around yaw axis 7. As the rotational speed of the counter-clockwise rotating opposing first pair of rotors (first rotor 10 and third rotor 30) is decreased and the rotational speed of the clockwise rotating opposing second pair of rotors (second rotor 20 and fourth rotor 40) is increased, rotor torque 110 and rotor torque 130 are decreased and rotor torque 120 and rotor torque 140 are increased. Additionally, the magnitudes of side thrust component 520 and side thrust component 540 increase, and the magnitudes of side thrust component 510 and thrust component 530 decrease. The unbalanced side thrust components produce asymmetrical thrust-based torques on rotorcraft 500 that supplements the asymmetrical rotor torques, which moves rotorcraft 500 in a counter-clockwise direction.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A rotorcraft, comprising:
   a frame, having a roll axis, a pitch axis, and a yaw axis; and
   a plurality of rotors, connected to the frame,
   wherein
   the pitch axis is perpendicular to the roll axis;
   the plurality of rotors comprises at least four rotors,
   two of the at least four rotors are configured for counter-clockwise rotation,
   another two of the at least four rotors are configured for clockwise rotation,
   each of the plurality of rotors comprises a rotor shaft, canted with respect to at least one of the roll axis and the pitch axis,
   each of the plurality of rotors comprises an upper rotor and a lower rotor, and
   the lower rotor of each of the plurality of rotors is co-axial with the upper rotor of each of the plurality of rotors and is configured to rotate in a direction, in which the upper rotor of each of the plurality of rotors is configured to rotate; and
   at least two additional rotors, comprising a rotor shaft, wherein
   each of the at least two additional rotors comprises an upper rotor and a lower rotor, and
   the lower rotor of each of the at least two additional rotors is co-axial with the upper rotor of the at least two additional rotors and is configured to rotate in a direction, opposite to that, in which the upper rotor of the at least two additional rotors is configured to rotate.

2. The rotorcraft of claim 1, wherein the rotor shaft of each of the plurality of rotors is canted at an angle between 3 and 15 degrees with respect to at least one of the roll axis and the pitch axis of the frame.

3. The rotorcraft of claim 2, wherein the rotor shaft of each of the at least two additional rotors is canted with respect to an axis, perpendicular to the pitch axis of the frame, so that a forward thrust component is created when the at least two additional rotors are rotated.

4. The rotorcraft of claim 3, wherein the rotor shaft of each of the at least two additional rotors is canted with respect to the axis, perpendicular to the pitch axis of the frame, at an angle between 3 and 15 degrees.

5. The rotorcraft of claim 1, wherein the rotor shaft of each of the plurality of rotors is canted at an angle between 3 and 15 degrees with respect to the roll axis of the frame.

6. The rotorcraft of claim 5, wherein the rotor shaft of each of the plurality of rotors is canted at an angle between 3 and 15 degrees with respect to the pitch axis of the frame.

7. The rotorcraft of claim 6, wherein the rotor shaft of each of the plurality of rotors is canted at a fixed angle with respect to the roll axis and the pitch axis of the frame.

8. The rotorcraft of claim 6, wherein the rotor shaft of each of the at least two additional rotors is canted with respect to an axis, perpendicular to the pitch axis of the frame, at an angle between 3 and 15 degrees.

9. The rotorcraft of claim 6, wherein the angle, at which the rotor shaft of each of the plurality of rotors is canted with respect to the roll axis is equal to the angle, at which the rotor shaft of each of the plurality of rotors is canted with respect to the pitch axis.

10. The rotorcraft of claim 5, wherein each of the at least four rotors produces a thrust component, oriented perpendicular to an imaginary ray, extending from the yaw axis of the frame.

11. The rotorcraft of claim 1, wherein the rotorcraft has a gross weight of 500 pounds or more or a payload capacity from about 100 to about 1000 pounds.

12. The rotorcraft of claim 1, wherein:
the at least four rotors and the at least two additional rotors are oriented in a hexagonal pattern, and the two additional rotors are aligned along the pitch axis of the frame.

13. The rotorcraft of claim 1, wherein the rotor shaft of each of the at least two additional rotors is parallel to the yaw axis of the frame.

14. The rotorcraft of claim 1, wherein for each of the plurality of rotors, a lateral distance of the upper rotor to the roll axis of the frame is smaller than a lateral distance of the lower rotor to the roll axis of the frame.

15. The rotorcraft of claim 1, wherein the rotor shaft of each of the plurality of rotors is canted at an angle of more than 15 degrees with respect to at least one of the roll axis and the pitch axis of the frame.

16. A rotorcraft, comprising:
a frame, having a roll axis, a pitch axis, and a yaw axis;
at least four rotors, connected to the frame and oriented across the frame in pairs of opposing rotors,
wherein
both rotors in each of the pairs of opposing rotors are rotatable in the same direction,
each of the at least four rotors has an axis of rotation that is non-parallel and non-perpendicular to the yaw axis of the frame,
each of the at least four rotors comprises an upper rotor and a lower rotor, and
the lower rotor of each of the at least four rotors is co-axial with the upper rotor of each of the at least four rotors and is configured to rotate in a direction, in which the upper rotor of each of the at least four rotors is configured to rotate; and
at least two additional rotors, each having an axis of rotation,
wherein
each of the at least two additional rotors comprises an upper rotor and a lower rotor, and
the lower rotor of each of the at least two additional rotors is co-axial with the upper rotor of the at least two additional rotors and is configured to rotate in a direction, opposite to that, in which the upper rotor of the at least two additional rotors is configured to rotate.

17. The rotorcraft of claim 16, wherein each of the at least four rotors produces a thrust component, oriented perpendicular to an imaginary ray, extending from the yaw axis of the frame.

18. The rotorcraft of claim 16, wherein the axis of rotation of each of the at least two additional rotors is canted with respect to an axis that is perpendicular to the pitch axis of the frame at an angle between 3 and 15 degrees.

19. The rotorcraft of claim 16, wherein the axis of rotation of each of the at least four rotors is canted at an angle between 3 and 15 degrees with respect to the roll axis of the frame.

20. The rotorcraft of claim 19, wherein the axis of rotation of each of the at least four rotors is canted at an angle between 3 and 15 degrees with respect to the pitch axis of the frame.

21. The rotorcraft of claim 20, wherein the angle of the axis of rotation of each of the at least four rotors with respect to the roll axis of the frame is equal to the angle of the axis of rotation of each of the at least four rotors with respect to the pitch axis of the frame.

22. The rotorcraft of claim 19, wherein the axis of rotation of each of the at least two additional rotors is canted with respect to an axis, perpendicular to the pitch axis of the frame, to create a forward thrust component when the at least two additional rotors are rotated.

23. The rotorcraft of claim 22, wherein the axis of rotation of each of the at least two additional rotors is canted with respect to the axis, perpendicular to the pitch axis of the frame, at an angle between 3 and 15 degrees.

24. A method of operating the rotorcraft of claim 16, the method comprising:
supplying power to the at least four rotors of the rotorcraft, wherein a first pair of opposing rotors of the pairs of opposing rotors comprises a first rotor and a third rotor, located on opposite sides of both the roll axis and the pitch axis of the rotorcraft, and a second pair of opposing rotors of the pairs of opposing rotors comprises a second rotor and a fourth rotor, located on the opposite sides of both the roll axis and the pitch axis;
supplying power to the at least two additional rotors of the rotorcraft and causing the at least two additional rotors to rotate, wherein the at least two additional rotors are each canted at an angle at which rotation of the at least two additional rotors produces a thrust component, parallel to the roll axis of the frame, and a thrust component, parallel to the yaw axis of the frame;
causing the first pair of opposing rotors to each rotate about the axis of rotation of a respective one of the first pair of opposing rotors in a first direction and causing the second pair of opposing rotors to each rotate about the axis of rotation of a respective one of the second pair of opposing rotors in a second direction, opposite the first direction; and
initiating a yawing maneuver that increases a rotational speed of the first pair of opposing rotors so that thrust is produced by the first pair of opposing rotors, wherein a component of the thrust is non-parallel to the yaw axis of the frame.

25. The method of claim 24, wherein the component of the thrust is oriented perpendicular to an imaginary ray, extending from the yaw axis of the frame.

26. The rotorcraft of claim 16, wherein the axis of rotation of each of the at least two additional rotors is parallel to the yaw axis of the frame.

27. The rotorcraft of claim 16, wherein for each of the at least four rotors, a lateral distance of the upper rotor to the roll axis of the frame is smaller than a lateral distance of the lower rotor to the roll axis of the frame.

* * * * *